(12) United States Patent
Zhu et al.

(10) Patent No.: US 11,658,488 B2
(45) Date of Patent: May 23, 2023

(54) PHOTOVOLTAIC POWER OPTIMIZATION SYSTEM

(71) Applicant: Delta Electronics (Shanghai) Co., Ltd., Shanghai (CN)

(72) Inventors: Xuancai Zhu, Shanghai (CN); Bingwen Weng, Shanghai (CN); Qin Wang, Shanghai (CN); Wei Zhao, Shanghai (CN)

(73) Assignee: DELTA ELECTRONICS (SHANGHAI) CO., LTD., Shanghai (CN)

(*) Notice: Subject to any disclaimer, the term of this patent is extended or adjusted under 35 U.S.C. 154(b) by 34 days.

(21) Appl. No.: 16/734,431

(22) Filed: Jan. 6, 2020

(65) Prior Publication Data
US 2020/0373761 A1 Nov. 26, 2020

(30) Foreign Application Priority Data
May 23, 2019 (CN) .......................... 201920751348.2

(51) Int. Cl.
*H02J 3/38* (2006.01)
*H02S 40/32* (2014.01)
*H02J 13/00* (2006.01)

(52) U.S. Cl.
CPC ........ *H02J 3/381* (2013.01); *H02J 13/00026* (2020.01); *H02S 40/32* (2014.12);
(Continued)

(58) Field of Classification Search
CPC .. H02J 3/381; H02J 13/00026; H02J 2300/26; H02J 3/38; H02J 1/00; H02J 3/00; H02J 7/00; H02J 3/001; H02J 3/003; H02J 3/004; H02J 3/005; H02J 3/007; H02J 3/06; H02J 3/14; H02J 2300/00; H02J 2300/20; H02J 2300/24; H02J 2300/22; H02J 2300/25; H02J 2300/40; H02J 3/382; H02J 3/383; H02J 3/385; H02J 3/388; H02J 3/46; H02J 3/466; H02J 3/472; H02S 40/32; H02S 50/00; H02S 40/30; Y04S 10/50; Y04S 10/123; Y04S 40/126; Y02E 60/00; Y02E 40/70; Y02E 10/56; Y02E 10/00;
(Continued)

(56) References Cited

U.S. PATENT DOCUMENTS 8,823,218 B2  9/2014  Hadar et al.
8,859,884 B2  10/2014 Dunton et al.
(Continued)

FOREIGN PATENT DOCUMENTS

CN          106602998 A      4/2017

*Primary Examiner* — Elim Ortiz
(74) *Attorney, Agent, or Firm* — CKC & Partners Co., LLC

(57) ABSTRACT

The disclosure discloses a photovoltaic power optimization system, comprising: a plurality of photovoltaic panels; a photovoltaic optimizing module array comprising a plurality of photovoltaic optimizing modules connected in series, each of the photovoltaic optimizing modules being electrically connected to at least one of the photovoltaic panels; an inverter electrically connected to an output terminals of the photovoltaic optimizing module array for converting a DC power into an AC power; and a data center unit communicates wirelessly with at least one of the photovoltaic optimizing modules, and also communicates with the inverter via power line.

8 Claims, 3 Drawing Sheets

(52) U.S. Cl.
CPC ........... *H02J 2300/26* (2020.01); *Y02E 10/56* (2013.01); *Y02E 40/70* (2013.01); *Y02E 60/00* (2013.01)

(58) Field of Classification Search
CPC .... Y02E 10/50–65; H04B 3/548; H04B 3/54; H01L 31/02021; G05F 1/00; H02M 3/00; H02M 7/00; H02M 1/00
USPC ......... 307/18, 25, 43, 52, 66, 71, 77, 80–83, 307/103, 131, 212, 243, 244, 24, 151, 63, 307/129, 31, 86, 87, 106, 125, 130, 147, 307/26, 72, 84, 109, 116, 143, 23, 29, 44, 307/49, 62, 64, 78, 85; 323/906, 234, 323/282, 272, 274, 207, 225, 283, 351, 323/224, 311, 290; 363/95, 131, 78, 97, 363/13, 132, 144, 17, 18, 34, 35, 40, 55, 363/56.01, 65, 69, 71, 79, 89; 320/101, 320/109, 166, 128, 102, 140, 162, 163, 320/119, 145, 118, 126, 125, 149, 148
See application file for complete search history.

(56) References Cited

U.S. PATENT DOCUMENTS

| | | | | |
|---|---|---|---|---|
| 2014/0368047 | A1* | 12/2014 | Li | H02J 1/00 307/82 |
| 2015/0171789 | A1* | 6/2015 | Har-Shai | H01L 31/02021 307/66 |
| 2016/0254672 | A1* | 9/2016 | Yoscovich | H02J 3/385 307/77 |
| 2016/0301214 | A1 | 10/2016 | Makhota et al. | |
| 2018/0329382 | A1* | 11/2018 | Somani | H02J 3/32 |

* cited by examiner

PHOTOVOLTAIC POWER OPTIMIZATION SYSTEM

CROSS-REFERENCE TO RELATED APPLICATIONS

This application claims the benefit of Chinese Utility Model Patent Application No. 201920751348.2, filed May 23, 2019, which the entire disclosure of which is incorporated by reference herein for all purposes.

FIELD

The disclosure relates to a photovoltaic power optimization system, and more particularly to a photovoltaic power optimization system having wireless communication and power line communication.

BACKGROUND

In the photovoltaic system, cooperation is required among the photovoltaic optimizing modules and the inverter to ensure safe start-up, stable operation and rapid shut-down of the system, so a reliable communication needs to be established. The existing photovoltaic system mostly implements extra signal wires for the communication, using RS485, CAN bus or other protocols. However, since the photovoltaic system has a high requirement for waterproof, adding extra signal wires reduces system reliability and increases installation cost.

SUMMARY

The technical problem to be solved by the disclosure is to provide a photovoltaic power optimization system, comprising:
a plurality of photovoltaic panels;
a photovoltaic optimizing module array comprising a plurality of photovoltaic optimizing modules connected in series, each of the photovoltaic optimizing modules being electrically connected to at least one of the photovoltaic panels;
an inverter electrically connected to output terminals of the photovoltaic optimizing module array for converting a DC power into an AC power; and
a data center unit communicates with at least one of the photovoltaic optimizing modules wirelessly, and also communicates with the inverter via power line.

In the photovoltaic power optimization system, the photovoltaic optimizing modules communicate with at least one of adjacent photovoltaic optimizing modules in the photovoltaic optimizing module array wirelessly.

In the photovoltaic power optimization system, the data center unit comprises a first wireless communication module and a power line communication module electrically connected to the wireless communication module.

In the photovoltaic power optimization system, each of the photovoltaic optimizing modules comprises:
a microcontroller, which collects data information of the photovoltaic power optimization system, and also controls the photovoltaic optimizing modules; and
a second wireless communication module.

In the photovoltaic power optimization system, the collected data information is transmitted to the first wireless communication module of the data center unit via the second wireless communication module of each of the photovoltaic optimizing module, and the data center unit transmits the collected data information to the inverter via the power line communication module.

In the photovoltaic power optimization system, the inverter transmits control information to the power line communication module of the data center unit via power line, and the data center unit transmits the control information to the second wireless communication modules of the photovoltaic optimizing modules via the first wireless communication module.

In the photovoltaic power optimization system, the second wireless communication module communicates wirelessly with the second wireless communication module of the adjacent photovoltaic optimizing module.

In the photovoltaic power optimization system, the wireless communication adopts WiFi communication protocol.

In the photovoltaic power optimization system, the wireless communication adopts ZigBee communication protocol.

Effects of the disclosure over the prior art lie in: the disclosure realizes data exchange between the photovoltaic optimizer and the inverter by integrating characteristics of multiple communication methods, and combining respective advantages of wireless communication and power line communication. Data exchange between the photovoltaic optimizing modules, and between the photovoltaic optimizing modules and the data center unit can be carried out by wireless communication, and data exchange between the data center unit and the inverter is carried out by power line communication. This hybrid communication model has low cost, fast communication rate, and high reliability, effectively coordinates operation of respective photovoltaic optimizing module and the inverter, achieving maximum power point tracking and rapid shut-down functions.

DETAILED DESCRIPTION

Hereinafter the disclosure is further described in detail with reference to accompanying drawings and specific embodiments. The embodiment is carried out on the premise of the technical solution of the disclosure with detailed implementations and operational processes, but the extent of protection of the disclosure is not limited to the examples below.

Figure 1:
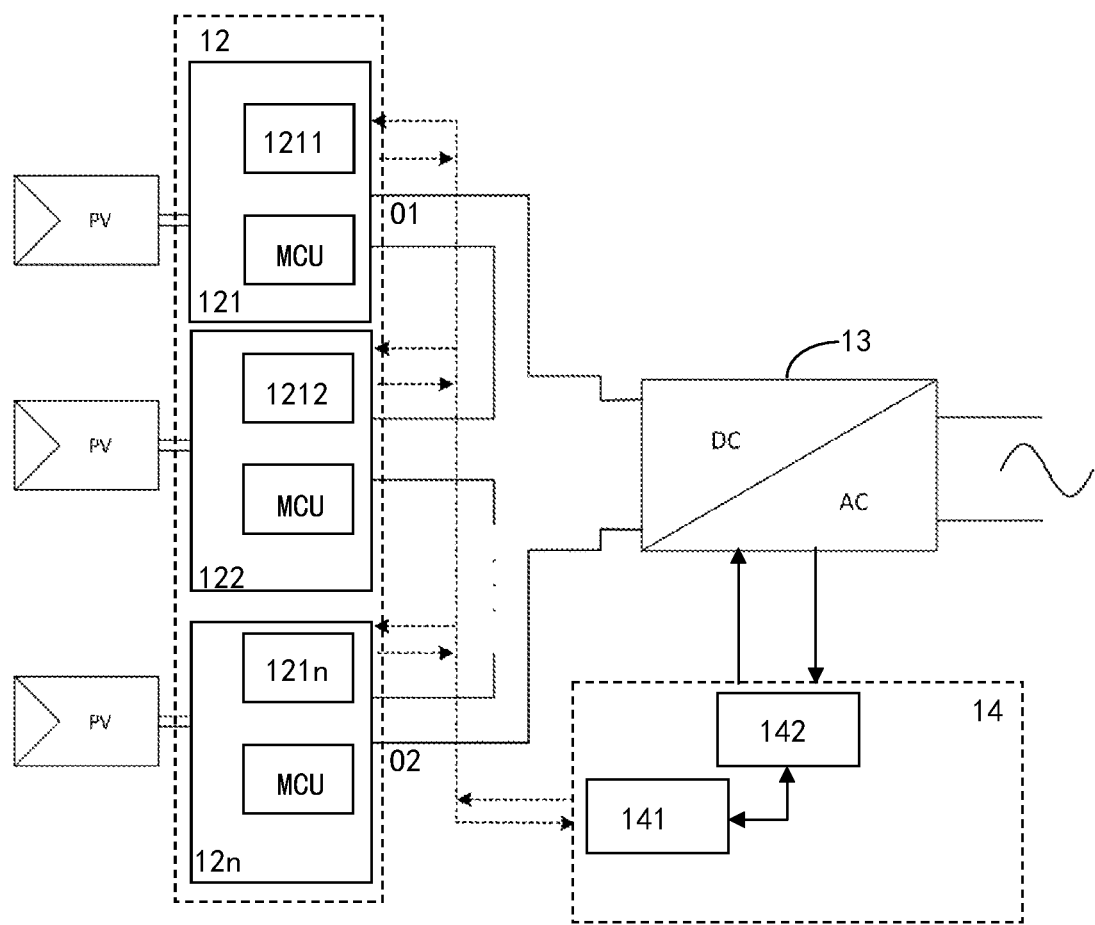
FIG. 1 is a structural diagram of a photovoltaic power optimization system in the first embodiment of the disclosure.

Please refer to FIG. 1, which is a structural diagram of a photovoltaic power optimization system in the first embodiment of the disclosure. As shown in FIG. 1, the photovoltaic power optimization system of the disclosure comprises: a plurality of photovoltaic panels PV; a photovoltaic optimizing module array 12 comprising a plurality of photovoltaic optimizing modules 121, . . . , 12$n$ connected in series, wherein n is a positive integer, each of the photovoltaic optimizing modules being electrically connected to at least one of the photovoltaic panels PV; an inverter 13 electrically connected to output terminals 01, 02 of the photovoltaic optimizing module array 12 for converting a DC power into an AC power; and a data center unit 14 communicates with at least one of the photovoltaic optimizing modules wirelessly, and also communicates with the inverter 13 via power line, enabling communication among the inverter 13 and the photovoltaic optimizing modules 121, . . . , 12n. In this embodiment, one photovoltaic optimizing module is correspondingly connected to one photovoltaic panel, but the disclosure is not limited thereto.

Further, the data center unit 14 comprises a first wireless communication module 141 and a power line communication module 142 electrically connected to the wireless communication module 141. Each of the photovoltaic optimizing modules comprises: a microcontroller MCU collecting data information of the photovoltaic power optimization system, and also controlling the corresponding photovoltaic optimizing modules based on control information; and a second wireless communication module 1211, . . . , 12n1.

After collecting the data information, the microcontroller MCU of each of the photovoltaic optimizing modules transmits the data information to the first wireless communication module 141 of the data center unit 14 via the second wireless communication module correspondingly, wherein the data information includes sampled information of current, voltage, power, temperature and the like, and the data center unit 14 transmits the data information to the inverter 13 via the power line communication module 142. The inverter can efficiently track the maximum power based on the received data information, samples and updates power generation data of each photovoltaic optimizing module in real time, and has functions of data query and analysis, such that performance of each of the photovoltaic optimizing modules can be evaluated, and the abnormal photovoltaic optimizing modules can be pre-judged, located or timely treated, thereby achieve intelligent operation. Similarly, control signals at the inverter side are also sent to each of optimizers via power line communication and wireless communication to realize bidirectional communication between the optimizer and the inverter, and realize safe start, maximum power track and rapid shut-down functions of the photovoltaic system through cooperation with each other. The inverter 13 also transmits the control information to the power line communication module 142 of the data center unit 14 via power line communication, and the data center unit 14 transmits the control information to the second wireless communication modules 1211, . . . , 12n1 of the photovoltaic optimizing modules 121, . . . , 12n via the first wireless communication module 141.

It should be noted that in this example, the wireless communication may adopt WiFi communication protocol or ZigBee communication protocol, but the disclosure does not limit the form of communication protocol.

Figure 2:
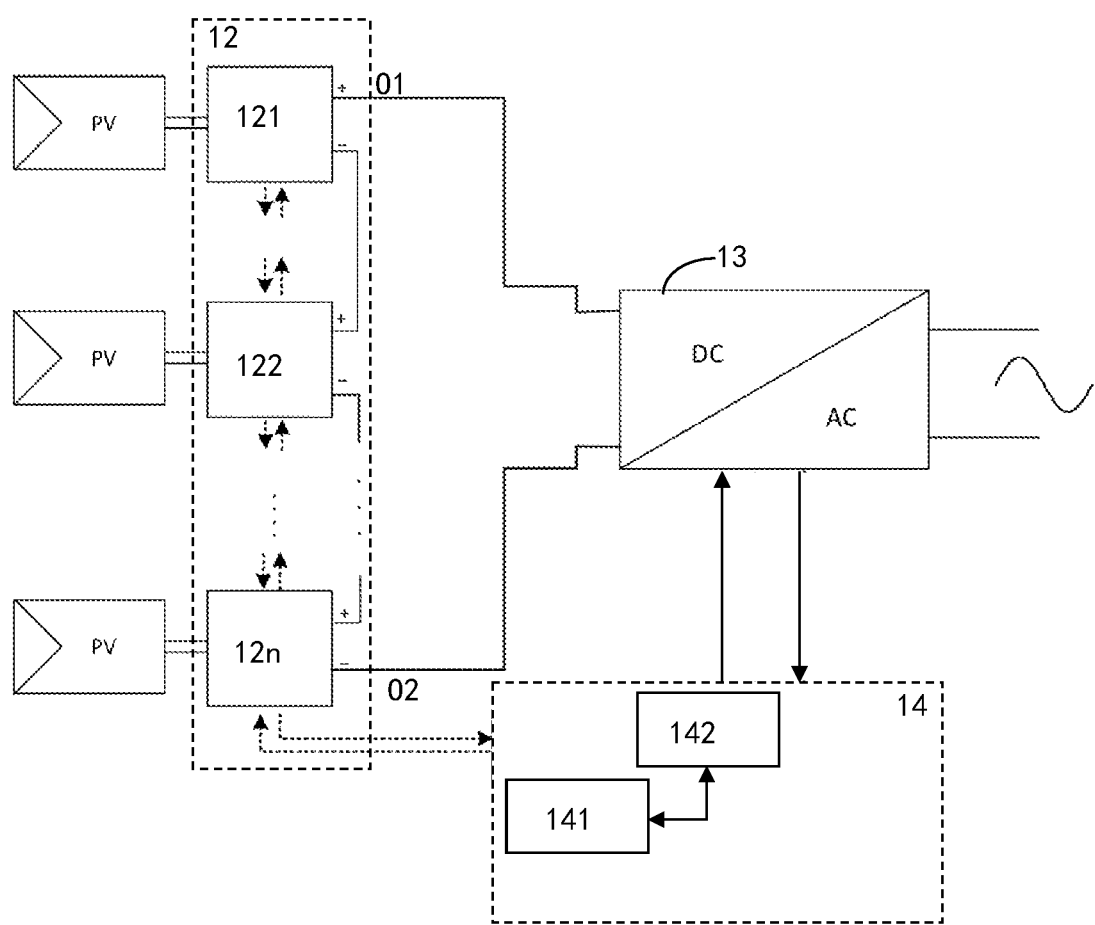
FIG. 2 is a structural diagram of a photovoltaic power optimization system in the second embodiment of the disclosure.

Please refer to FIG. 2, which is a structural diagram of a photovoltaic power optimization system in the second embodiment of the disclosure. The photovoltaic power optimization system shown in FIG. 2 has substantially the same structure as the photovoltaic power optimization system shown in FIG. 1, so the same parts are not described here again. Now different parts are explained below. As shown in FIG. 2, in this embodiment, it provides a communication architecture different from that in the first embodiment. Structures of each of the photovoltaic optimizing modules and the data center unit 14 are the same as that in FIG. 1. The photovoltaic optimizing module communicates with at least one of the adjacent photovoltaic optimizing modules in the photovoltaic optimizing module array via wireless communication, i.e., its second wireless communication module communicates wirelessly with the second wireless communication module of the adjacent photovoltaic optimizing module. For example, the photovoltaic optimizing module 121 can transmit its data information to the adjacent photovoltaic optimizing module 122, the photovoltaic optimizing module 122 can transmit its own data information and the data information sampled by the photovoltaic optimizing module 121 to the next photovoltaic optimizing module, and so on. The photovoltaic optimizing module 12n can transmit its data information together with the data information sampled by other photovoltaic optimizing modules to the data center unit 14. On the other hand, the data center unit 14 also transmits the control information to a plurality of photovoltaic optimizing modules. For example, the data center unit 14 transmits control information to the adjacent photovoltaic optimizing module 12n, the photovoltaic optimizing module 12n transmits the received control information to the adjacent photovoltaic optimizing module 12n-1, and so on. In this way, the data center unit 14 can transmit the control information to any photovoltaic optimizing modules 121-12n in the network.

It shall be noticed that in this example, the photovoltaic optimizing module 121 serves as a signal source, and other photovoltaic optimizing modules serve as transmission nodes. The photovoltaic optimizing modules, as transmission nodes, only transmit the data information without replication, storage or processing. Similarly, control information of the inverter is also transmitted to each of the photovoltaic optimizing modules. At this time, the inverter can be considered as a signal source, and the photovoltaic optimizing modules, as transmission nodes, need to store, respond to and transmit the data to the adjacent photovoltaic optimizing modules. Therefore, bidirectional communication among the photovoltaic optimizing modules and the inverter is established, and safe start-up, maximum power point tracking and rapid shut-down functions of the photovoltaic system are achieved through cooperation with each other.

It shall be noted that in this example, a condition of judging whether any two of the photovoltaic optimizing modules are adjacent is that a linear distance therebetween is no more than 10 meters, but the disclosure is not limited thereto. In another embodiment of the disclosure, a condition of judging whether any two of the photovoltaic optimizing modules are adjacent is that a linear distance therebetween is no more than 5 meters. In another embodiment of the disclosure, a condition of judging whether any two of the photovoltaic optimizing modules are adjacent is that a linear distance therebetween is no more than 50 meters, depending on certain application requirements.

Figure 3:
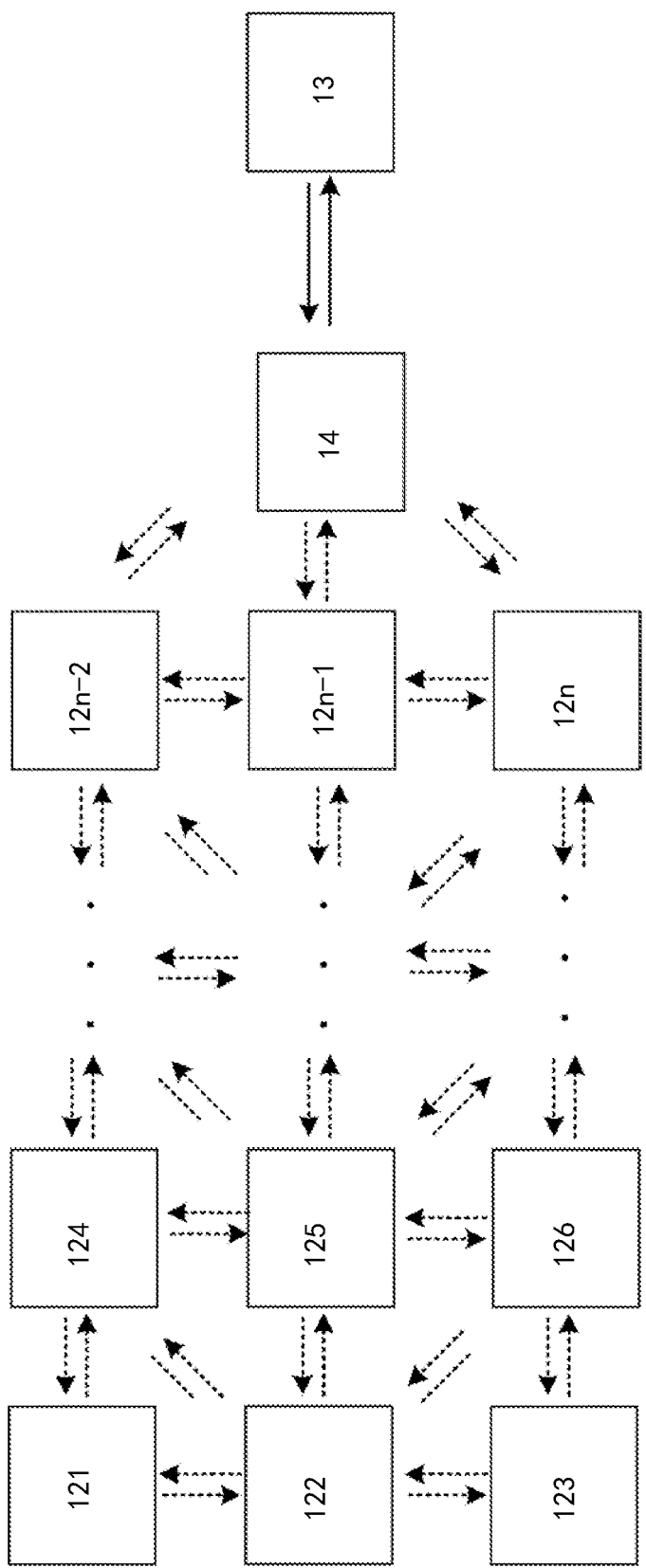
FIG. 3 is a structural diagram of a photovoltaic power optimization system in the third embodiment of the disclosure.

With further refer to FIG. 3, a structural diagram of a photovoltaic power optimization system in the third embodiment is presented. As shown in FIG. 3, in this example, in order to improve error tolerance of the communication model, the disclosure further provides another communication architecture. Structures of each of the photovoltaic optimizing modules and the data center unit 14 are the same as that in FIG. 1. Meanwhile, in order to facilitate describing, the photovoltaic panels PV are omitted. The photovoltaic optimizing module 121, as the signal source in this example, can transmit data information to all of the adjacent photovoltaic optimizing modules, such as, photovoltaic optimizing module 122 and 124. The photovoltaic optimizing module 122 then transfers the data information to all of the adjacent photovoltaic optimizing modules, such as, photovoltaic optimizing module 123, 126, 124, 125, the photovoltaic optimizing module 124 then transfers the data information to all of the adjacent photovoltaic optimizing modules, such as, photovoltaic optimizing module 121, 122, 125, and so on, until the data information has been transmitted to the data center unit 14. And the data information is then transmitted to the inverter 13 via the data center unit 14. This communication architecture greatly improves reliability of communication, and even if a part of the photovoltaic optimizing modules cannot work due to shielding of clouds or hardware damage, faults of data packet dropout, interruption and the like will not occur, which effectively improves efficiency and error tolerance of data communication. Similarly, when the inverter serves as the signal source, after the control information is transmitted to the data center unit 14 via power line communication, the data center unit 14 transmits the control information to all of the adjacent photovoltaic optimizing modules, and the adjacent photovoltaic optimizing modules receive, store, transfer and respond to the control information. Each of the photovoltaic optimizing modules may receive the same control information for several times, but only respond once, and then transmit control information, so each of the photovoltaic optimizing modules can be ensured to the maximum limit to receive the control information from the inverter, and respond, such that safe start-up, maximum power point tracking and rapid shut-down functions of the photovoltaic system are achieved through cooperation with the inverter.

In conclusion, the disclosure realizes data exchange between the photovoltaic optimizer and the inverter by integrating characteristics of multiple communication methods, and combining respective advantages of wireless communication and power line communication. Data exchange between the photovoltaic optimizing modules, and between the photovoltaic optimizing modules and the data center unit can be carried out by wireless communication, and data exchange between the data center unit and the inverter is carried out by power line communication. This hybrid communication model has low cost, fast communication rate, and high reliability, effectively coordinates operation of respective photovoltaic optimizing module and the inverter, achieving maximum power point tracking and rapid shut-down functions.

Although the disclosure has been disclosed by the above embodiments, the disclosure is not limited thereto. The relevant technicians in the art of the disclosure shall make various variations and modification without departing from the scope of the disclosure. Therefore, the scope of protection of the disclosure shall be determined by the scope of protection of the appended claims.

What is claimed is:

1. A photovoltaic power optimization system, comprising:
a plurality of photovoltaic panels;
a photovoltaic optimizing module array, comprising
  a plurality of photovoltaic optimizing modules connected in series, each of the photovoltaic optimizing module being electrically connected to at least one of the photovoltaic panels;
an inverter electrically connected to output terminals of the photovoltaic optimizing module array, for converting a DC power into an AC power; and
a data center unit wirelessly communicates with at least one of the photovoltaic optimizing modules, and also communicates with the inverter via power line; and
the plurality of photovoltaic optimizing modules comprising N groups of photovoltaic optimizing modules, wherein the distance between each group of the N groups of photovoltaic optimizing modules and the data center gets closer from a first group to a N-th group of the N groups of photovoltaic optimizing modules;
the first group comprising of one photovoltaic optimizing module, which serves as a signal source for collecting data information and transmitting the collected data information to photovoltaic optimizing modules of a second group of the N groups of photovoltaic optimizing modules,
the second group comprising of more than one photovoltaic optimizing modules, and the first group of photovoltaic optimizing module is adjacent to the second group of photovoltaic optimizing module,
each of a k-th group, a (k−1)th group and a (k+1)th group of the N groups of photovoltaic optimizing module comprising of more than one photovoltaic optimizing modules, each photovoltaic optimizing module of the k-th group serves as transmission node for collecting data information, receiving data information from photovoltaic optimizing modules of the (k−1)th group and other photovoltaic optimizing modules of the k-th group, and transmitting the collected data information and received data information to photovoltaic optimizing modules of the (k+1)th group and other photovoltaic optimizing modules of the k-th group, and the k-th group is adjacent to the (k−1)th group and the (k+1)th group 2<k<(N−1),
and each photovoltaic optimizing module of a N-th group of the N groups of photovoltaic optimizing modules serves as transmission node for collecting data information, receiving data information from photovoltaic optimizing modules of a (N−1)th group of the N groups of photovoltaic optimizing modules and other photovoltaic optimizing modules of the N-th group, and transmitting the collected data information and received data information to the data center unit and other photovoltaic optimizing modules of the N-th group, the N-th group is adjacent to the (N−1)th group and the data center unit.

2. The photovoltaic power optimization system according to claim 1, wherein the data center unit comprises a first wireless communication module and a power line communication module electrically connected to the first wireless communication module.

3. The photovoltaic power optimization system according to claim 2, wherein each of the photovoltaic optimizing modules comprises: a microcontroller, which collects the data information of the photovoltaic power optimization system, and also controls the photovoltaic optimizing modules; and a second wireless communication module.

4. The photovoltaic power optimization system according to claim 3, wherein the collected data information is transmitted to the first wireless communication module of the data center unit via the second wireless communication module of each of the photovoltaic optimizing module, and the data center unit transmits the collected data information to the inverter via the power line communication module.

5. The photovoltaic power optimization system according to claim 3, wherein the inverter transmits the control information to the power line communication module of the data center unit via power line, and the data center unit transmits control information to the second wireless communication modules of the photovoltaic optimizing modules via the first wireless communication module.

6. The photovoltaic power optimization system according to claim 3, wherein each of the second wireless communication module communicates wirelessly with the second wireless communication module of the adjacent photovoltaic optimizing module.

7. The photovoltaic power optimization system according to claim 1, wherein the wireless communication is a WiFi communication protocol.

8. The photovoltaic power optimization system according to claim 1, wherein the wireless communication is a ZigBee communication protocol.

\* \* \* \* \*